Sept. 22, 1936.  J. KREMER  2,054,937
METHOD OF TREATING PLASTIC SUBSTANCES
Filed July 30, 1932    2 Sheets-Sheet 2
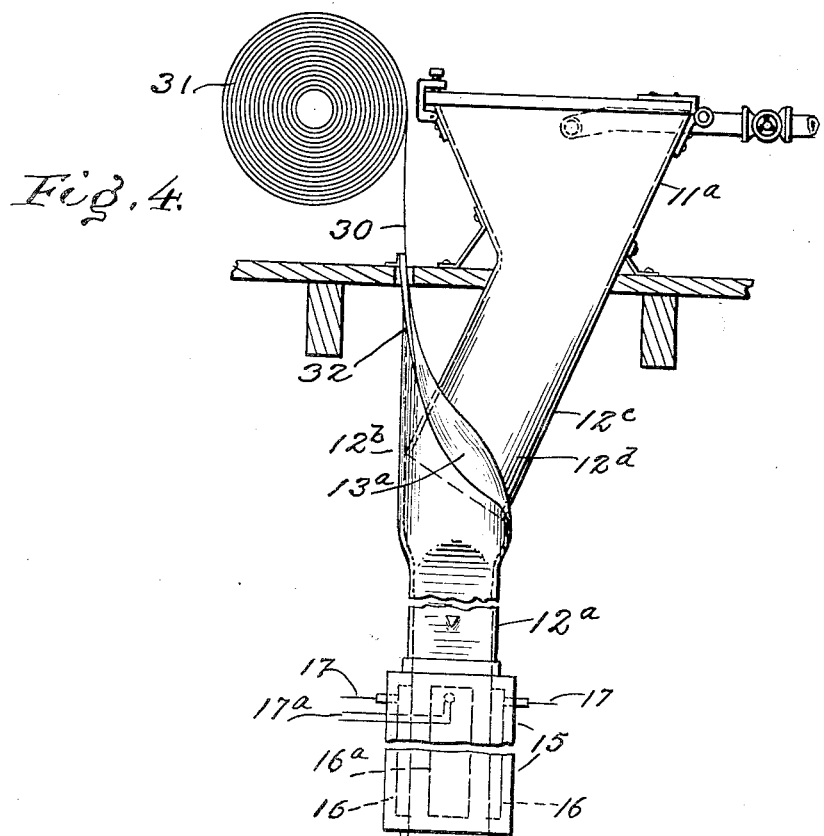
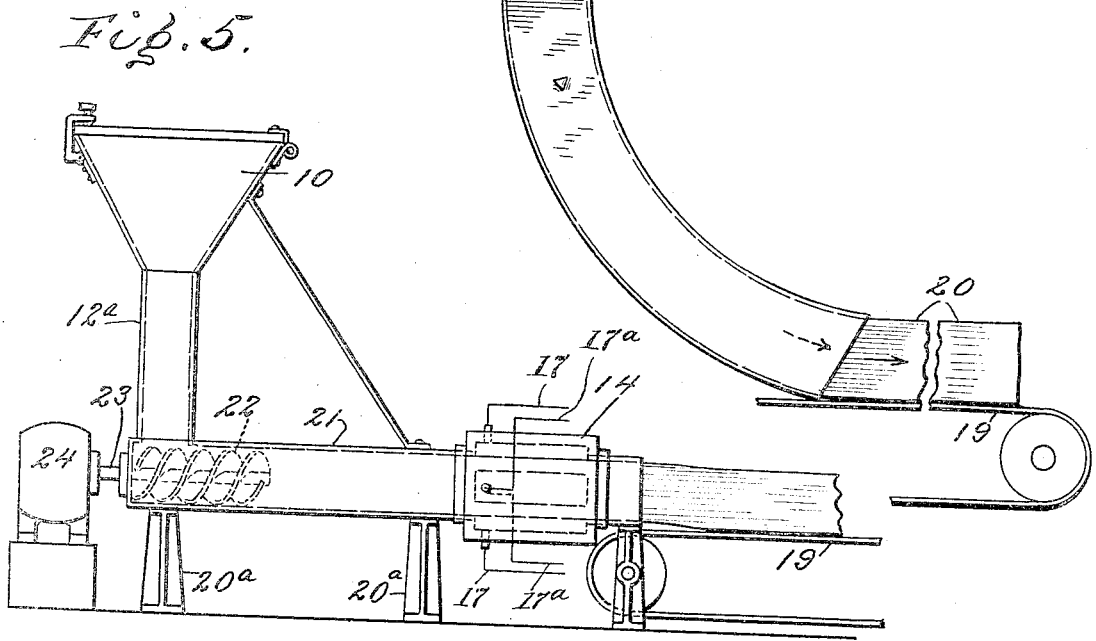
INVENTOR.
John Kremer
BY
Conrad A. Dieterich
his ATTORNEY.

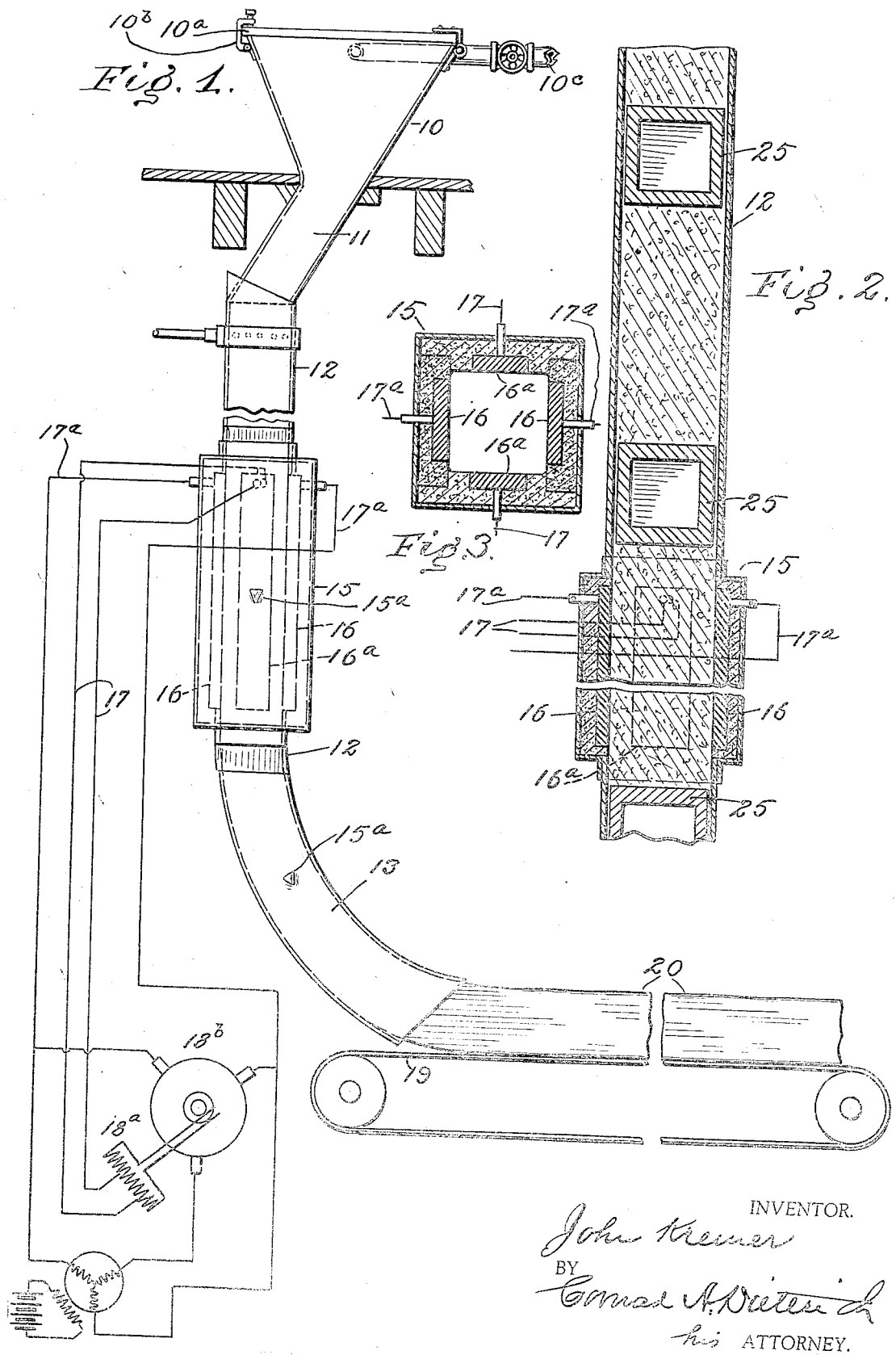

Patented Sept. 22, 1936

2,054,937

UNITED STATES PATENT OFFICE 2,054,937

METHOD OF TREATING PLASTIC SUBSTANCES

John Kremer, Southport, Conn.

Application July 30, 1932, Serial No. 626,538

9 Claims. (Cl. 107—54)

My invention relates to improvements in heating dough and other products and the same has for its object to provide a simple, efficient and reliable method for treating plastic or semi-plastic masses and analogous products, whereby to dry, bake, change or harden the same.

Further, said invention has for its object to provide a method by which bread, dough or other products whether cellular or non-cellular in character may be treated in a continuous or substantially continuous operation.

Further, said invention has for its object to provide a method by which the dough or other product is discharged from a suitable hopper or receptacle and fed into a suitable element or duct connected to or communicating with the outlet of said hopper, and then, while the dough is passing through said element or duct, subjected to the action of a medium whereby the plastic mass is dried, baked or otherwise converted into more or less hard condition and molded to shape.

Further, said invention has for its object to provide a method of baking bread and analogous dough product by which the dough is caused to pass through a suitable tubular element or duct, and in the course of passage therethrough, and before its discharge therefrom is subjected to heat or to the action of electric energy, or electro-magnetic waves, or to a changing electric or magnetic field in order to bake the same.

Further, said invention has for its object to provide a method of enclosing a mass of plastic material with a flexible envelope or wrapper, and drying, heating or baking the material or substance by applying electric current thereto, providing for the escape of water or other fluids therefrom during such operation.

Further, said invention has for its object to provide a method of treating a mass of plastic material, and providing for the escape of water or other fluids therefrom which may be created or which may occur during the treatment of the mass.

Further, said invention has for its object to provide a method of baking bread and analogous dough products by which the plastic dough, as it issues from a hopper or container is forced through a tubular element or duct and past electric elements located therein whereby the plastic dough mass is converted into a continuous body of more or less hard condition and molded to form.

Other objects will in part be obvious, and in part hereinafter be pointed out.

To the attainment of the aforesaid objects and ends, my invention resides in the successive steps constituting the method hereinafter more fully described, and then pointed out in the claims.

In the accompanying drawings—

Figure 1 is a diagrammatic view showing in side elevation one form of apparatus for carrying out my said invention;

Fig. 2 is an enlarged side view, partly in section showing the arrangement of spacing means for the dough elements;

Fig. 3 is a transverse section on the line 3—3 of Fig. 1;

Fig. 4 is a similar view illustrating a modified form of apparatus, and

Fig. 5 is a side elevation showing a further modification.

In Figure 1 of said drawings 10 designates a suitable hopper or receptacle which is supported in an elevated position, as for example, in the floor above, and having its outlet 11 in the form of a chute connected to the upper end of a conduit which may be of any suitable form, but is here shown as a tubular element 12 which is preferably supported in a more or less vertical position. The height of the hopper 10 and the length of the tubular element or conduit 12 should be such as will provide the necessary head to insure the due passage of the dough mass through the same. When it is desired to force the dough mass through the apparatus, or to submit the same to pressure above or below atmospheric pressure the hopper 10 may be provided with a hinged cover 10$^a$ having a locking device 10$^b$, and a pipe 10$^c$ having one end communicating with the hopper 10 and its other end connected to a suitable fluid compression or suction apparatus whereby the pressure upon the dough mass may be varied. The lower portion of said tubular element or duct 12 is rounded at 13 and is suitably supported in any convenient manner. The baking element 15 is connected to the tubular element 12, intermediate the inlet and outlet thereof so that the dough on entering the same may, during the baking process, expand into and become molded to the form defined by the inner walls of said baking element.

The baking element may be of any desired form in cross-section, such, for example, as round, substantially rectangular or of tapering or varying width, and by preference is made of porcelain, soapstone or any suitable refractory or other material, and is provided upon its inner sides or walls with electrodes 16, 16a. The electrodes are arranged oppositely in pairs, and the electrodes 16a preferably being of less width than the electrodes 16. The electrodes 16a are connected by conductors 17 to the transformer 18, which is connected to the frequency changer 18a. The electrodes 16 are connected by conductors 17a to the alternating generator 18b. The electrodes are preferably made of carbon in the form of plates which are firmly fitted into corresponding recesses provided in the inner walls of the baking element with the inwardly facing surface flush with the inner walls of element 15.

19 denotes an endless conveyor upon which the baked dough mass may be discharged and conveyed in a continuous body 20 to any suitable point for further operations.

If it is desired to produce the bread in the form of separate elements or loaves instead of in the form of a continuous rod, the dough may be fed into the conduit 12 in measured charges or quantities, and the several charges maintained separated from one another by any suitable means, such, for example, as a spacing block 25, made of suitable material, introduced after each charge or quantity of dough which will hold the same duly separated during the movement of the mass through the conduit 10 and the baking element 15, and cause the baked dough to issue from the latter in separate units or loaves. The spacing blocks 25 may be connected by any convenient means such as wires or other flexible connection so as to assist in moving the dough mass through the conduit, and the said spacing blocks may, when formed of suitable material, serve to generate and/or retain heat to aid in the baking operation.

To relieve the tubular element 15 from internal pressure, the same may be provided at suitable intervals with vents 15a to permit of the escape of any liquids, vapors or gases present in the material treated. In some instances it may also be desirable to use a suitable lubricant to insure the due passage of the mass through the tubular element 15.

In operation the plastic dough is received in the hopper 10, and after passing through the tubular element enters the baking element 15 where the same is baked by the resistance of the mass to the passage of the electric current and molded to shape. The baking element may be of any suitable form in cross-section but by preference is made square or rectangular to impart that form to the finally baked dough mass.

The interior of the tubular element 15 and the hopper 10 and connected parts may be coated or supplied with a suitable lubricant, such, for example, as grease, water or other medium to keep the material free from the walls of the element in order to prevent the dough adhering to the interior of the walls of the tube during its movement through said tubular element and/or to form a better electric contact so as to facilitate the flow of current.

The movement of the dough through the tubular element and baking element should be so timed and/or the strength of the current so controlled that the dough will be sufficiently baked as it issues in the form of a continuous mass or rod, and is deposited upon the conveyor belt 19. Actual trial and experiment has demonstrated that from two to five minutes will ordinarily be sufficient time to complete baking of the mass.

When for any reason it is impossible or inconvenient to support the hopper 10 on the receiving end of the duct or tubular element 15 sufficiently high to obtain the necessary head for the dough mass, the same may be provided as shown at Fig. 5 with a relatively short tubular duct 12a communicating at its lower end with a transverse chamber 21 supported upon legs 20a. Within the chamber 21 is located any suitable means for feeding or forcing the dough mass through the same, such, for example, as a spiral conveyor 22 mounted upon a shaft 23 whose outer end, which extends through one end of the chamber 21, is fixed to one end of the shaft of a direct-coupled electric motor 24. The opposite end of the chamber 21 is open and provided with a baking element 14, generator 18 and conveyor 19, as above described.

When desirable, and to facilitate the baking operation, and to prevent the dough adhering to the walls of said conduit, the same may be enclosed, either wholly or partly, in a paper, textile fabric or other suitable porous material and so passed through the conduit 12.

In the modification shown at Fig. 4, the tubular element or duct 12a has its upper end 12b open to receive the lower end of a chute 12c leading from a hopper 11a, and has a curved outlet portion 12d. The lower end of the chute 12c is disposed within the open upper end of said duct 12a. The open upper end 12b of the tubular element or duct 12a is preferably circular in cross-section and is provided with curved edges 13a forming folding means which is adapted to engage the opposite longitudinal edges of a strip or sheet of paper 30 fed from a roll 31. The paper may, if desired, be lubricated and suitably rendered conductive, as by moistening the same with a suitable electrolyte or conductive grease.

The paper 30, after it leaves the roll 31, is received upon a flat extension 32 projecting from the rear end of the tubular element 12a, and then passes between the lower end of the inclined chute or duct 12c and the inner side of the folding device 13a by which the longitudinal edges of the strip of paper 30 are overlapped a short distance to enclose the dough as it is caused to issue from the lower end of said inclined duct or chute 12c and be forced onward, together with its surrounding envelope of paper.

No detailed description of the baking of the dough mass by the medium of electric energy or electromagnetic waves, etc. is given herein since such a method forms the subject matter of my earlier application Serial No. 354,467, filed April 12, 1929.

It will, of course, be obvious that the mass or rod 20 of baked bread may be severed either transversely or longitudinally into lengths or strips of any suitable size or shape as it issues from the baking element 15 or that the same may be carried away by the conveyor 19 to a distant point to permit of the baked bread becoming sufficiently cooled to render the cutting operation more easy, and appropriately severed at such distant point. The conveyor may be operated at such speed as to insure the due movement of the dough mass through the tubular element, and the removal or widthdrawal of the baked product from the delivery end of said element.

While I have shown and described my invention in connection with the baking of dough products, such as bread, cake and similar substances, it will, of course, be understood that the invention may be applied to the treatment of other substances or materials.

Further, it is to be noted that while I have described the treating of the dough mass in a continuous operation that the same may also be performed in a substantially continuous operation such as an interrupted or step-by-step movement of the mass.

It is to be noted that while I have described the invention in connection with the making of bread, and have used the term "bread" in the specification and claims that the said term is intended to include cake, and other products possessing similar qualities or characteristics.

Having thus described my said invention, what I claim and desire to secure by Letters Patent is:

1. The method of treating a mass of plastic material which consists in passing the same through a conduit to shape the same, interposing sheet material between the surfaces of said mass and the walls of said conduit whereby to maintain the mass out of contact with said walls during its passage through said conduit, and subjecting the mass to the action of a medium traversing the mass and said sheet material and generating heat within said mass to reduce the plasticity of the mass and hold the same to produced shape, substantially as specified.

2. The method of treating a mass of dough which consists in passing the same through a conduit, interposing sheet material between the surfaces of said dough mass and the adjacent walls of said conduit whereby to prevent direct contact of the mass with said walls during the passage of the mass through said conduit, and subjecting the mass to the action of electric energy whereby to heat the same by the internal resistance of the mass to the passage of said electric energy therethrough to bake the mass, substantially as specified.

3. The method of treating a mass of dough which consists in passing the same through a conduit, interposing sheet material between the surfaces of said dough mass and the adjacent walls of said conduit whereby to prevent the mass adhering to the walls of said conduit during the passage thereof through said conduit, and subjecting the mass to the action of electric energy to heat the mass and mold the same to shape, substantially as specified.

4. The method of treating a mass of plastic material which consists in moving the same through a stationary tubular conduit, subjecting the moving mass to the action of electric energy whereby to heat the same by the internal resistance of said mass to the action of said electric energy and converting the plastic mass into substantially solid form and then discharging said solidified mass in the form of a continuous product from said tubular element, substantially as specified.

5. The method of treating a mass of dough which consists in moving the same through a relatively stationary tubular conduit, subjecting the moving dough mass to the action of electric current whereby to heat the same by the internal resistance of said mass to the passage of said electric current and converting the dough mass into baked bread, discharging said baked bread in the form of a continuous body from said tubular conduit, substantially as specified.

6. The method of treating a mass of dough which consists in feeding the same in measured quantities into a stationary conduit, inserting spacing members between said measured quantities, moving said measured quantities and spacing members through said conduit, subjecting said measured quantities to the action of electric current whereby to heat the same by the internal resistance of said measured quantities to the passage of said electric current and converting the measured quantities into baked bread elements, and then discharging said baked elements from said conduit, substantially as specified.

7. The method of treating a mass of dough which consists in feeding the same in measured quantities into a stationary conduit, inserting spacing members between said measured quantities, moving said measured quantities and spacing members through said conduit, and into a baking chamber, subjecting said measured quantities to the action of electric current in its passage through said baking chamber whereby to heat the same by the internal resistance of said measured quantities to the passage of said electric current and converting the measured quantities into baked bread loaves, and then discharging said baked loaves from said baking chamber, substantially as specified.

8. The method of treating a mass of plastic material which consists in causing electric current to traverse the mass to effect a desired change therein while interposing sheets of material rendered electrically conductive between said mass and the planes of application of current thereto.

9. The method of treating a mass of plastic material which consists in passing the same through a conduit to shape the same, interposing sheet material between said mass and the walls of said conduit, and subjecting said mass while in said conduit to the action of electric current applied through said sheet material to reduce the plasticity of the mass.

JOHN KREMER.